(12) United States Patent
Su et al.

(10) Patent No.: US 11,528,194 B2
(45) Date of Patent: Dec. 13, 2022

(54) ENTERPRISE CONTROL PLANE FOR DATA STREAMING SERVICE

(71) Applicant: JPMORGAN CHASE BANK, N.A., New York, NY (US)

(72) Inventors: Henry Su, Westfield, NJ (US); Vishnu M. Balusu, Bangalore (IN); Michelle Beloff, East Brunswick, NJ (US); Sudhakara R. Jetti, West Windsor, NJ (US); Ashokkumar Kadambala, North Arlington, NJ (US); Shreesha Hebbar, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 278 days.

(21) Appl. No.: 16/893,483

(22) Filed: Jun. 5, 2020

(65) Prior Publication Data

US 2021/0075693 A1  Mar. 11, 2021

Related U.S. Application Data

(60) Provisional application No. 62/896,794, filed on Sep. 6, 2019.

(51) Int. Cl.
*H04L 41/18* (2022.01)
*H04L 41/50* (2022.01)
(Continued)

(52) U.S. Cl.
CPC .............. *H04L 41/18* (2013.01); *G06F 9/547* (2013.01); *G06F 21/44* (2013.01);
(Continued)

(58) Field of Classification Search
CPC . H04L 67/10–1097; H04L 41/00–5096; G06F 9/50–5094; G06F 9/455–2009/45595
See application file for complete search history.

(56) References Cited

U.S. PATENT DOCUMENTS 10,079,832 B1 *  9/2018  Dearment ........... H04L 63/0823
10,303,797 B1 *  5/2019  Menezes ................ G06F 16/137
(Continued)

OTHER PUBLICATIONS

L. Li, T. Tang and W. Chou, "A REST Service Framework for Fine-Grained Resource Management in Container-Based Cloud," 2015 IEEE 8th International Conference on Cloud Computing, 2015, pp. 645-652, doi: 10.1109/CLOUD.2015.91. (Year: 2015).*

*Primary Examiner* — Umar Cheema
*Assistant Examiner* — Julian Chang
(74) *Attorney, Agent, or Firm* — Greenblum & Bernstein, P.L.C.

(57) ABSTRACT

The invention relates to a computer-implemented method for providing an enterprise control plane for a data streaming service. The method may comprise providing a control plane user interface to enable a non-technical user to define a cluster logical abstraction dataset for an application, including a namespace, metadata, entitlement data, controls and governance data, and topics and size requirements related to the cluster and the application. The method may also include providing a representational state transfer (REST) interface to enable a technical user to specify cluster parameters using application programming interfaces (APIs). The method comprises automatically configuring the cluster and onboarding the application to the cluster following authentication.

20 Claims, 9 Drawing Sheets

(51) Int. Cl.
*H04L 41/5054* (2022.01)
*H04L 41/0668* (2022.01)
*H04L 41/046* (2022.01)
*H04L 41/0253* (2022.01)
*H04L 41/22* (2022.01)
*G06F 21/44* (2013.01)
*G06F 9/54* (2006.01)
*H04L 43/045* (2022.01)

(52) U.S. Cl.
CPC ........ *H04L 41/0253* (2013.01); *H04L 41/046* (2013.01); *H04L 41/0668* (2013.01); *H04L 41/22* (2013.01); *H04L 41/5054* (2013.01); *H04L 41/5096* (2013.01); *H04L 43/045* (2013.01)

(56) References Cited

U.S. PATENT DOCUMENTS

| | | | |
|---|---|---|---|
| 10,324,747 B1* | 6/2019 | Chakraborty | G06F 11/321 |
| 10,397,255 B1* | 8/2019 | Bhalotra | H04L 63/1425 |
| 10,630,566 B1* | 4/2020 | Nguyen | H04L 43/0817 |
| 10,909,131 B1* | 2/2021 | Graham | G06F 16/901 |
| 10,997,538 B1* | 5/2021 | Chandrachood | G06Q 10/06312 |
| 11,062,022 B1* | 7/2021 | Kalamkar | G06F 9/45558 |
| 11,159,366 B1* | 10/2021 | Gawade | G06F 9/45558 |
| 11,171,834 B1* | 11/2021 | Bockelmann | G06F 9/45558 |
| 11,275,573 B1* | 3/2022 | Javadekar | G06F 8/65 |
| 2003/0126240 A1* | 7/2003 | Vosseler | G06F 11/2025 714/E11.073 |
| 2005/0091346 A1* | 4/2005 | Krishnaswami | G06F 9/44505 719/310 |
| 2005/0273456 A1* | 12/2005 | Revanuru | G06F 9/546 |
| 2011/0219121 A1* | 9/2011 | Ananthanarayanan | H04L 67/1036 714/E11.073 |
| 2012/0185913 A1* | 7/2012 | Martinez | H04L 67/02 726/1 |
| 2012/0297016 A1* | 11/2012 | Iyer | H04L 43/06 709/217 |
| 2012/0297238 A1* | 11/2012 | Watson | G06F 11/3442 714/4.11 |
| 2013/0204917 A1* | 8/2013 | Wang | G06F 9/52 709/201 |
| 2013/0204991 A1* | 8/2013 | Skjolsvold | G06F 9/5083 709/223 |
| 2015/0088586 A1* | 3/2015 | Pavlas | G06F 9/45558 718/1 |
| 2015/0172369 A1* | 6/2015 | Surendran | H04L 67/06 709/201 |
| 2015/0195344 A1* | 7/2015 | Surendran | H04L 67/10 709/201 |
| 2015/0296016 A1* | 10/2015 | Bennett, Jr. | H04L 61/2007 709/213 |
| 2015/0312274 A1* | 10/2015 | Bishop | H04L 63/20 726/1 |
| 2016/0077936 A1* | 3/2016 | Tang | G06F 11/2097 714/4.11 |
| 2016/0359955 A1* | 12/2016 | Gill | G06F 9/45558 |
| 2017/0024293 A1* | 1/2017 | Bell | G06F 9/4881 |
| 2017/0075693 A1* | 3/2017 | Bishop | G06F 9/5088 |
| 2017/0083368 A1* | 3/2017 | Bishop | G06F 3/0631 |
| 2017/0083378 A1* | 3/2017 | Bishop | G06F 9/5072 |
| 2017/0083380 A1* | 3/2017 | Bishop | G06F 9/5083 |
| 2017/0085445 A1* | 3/2017 | Layman | G06F 8/34 |
| 2017/0177860 A1* | 6/2017 | Suarez | G06F 9/45558 |
| 2017/0177877 A1* | 6/2017 | Suarez | G06F 16/2455 |
| 2017/0180346 A1* | 6/2017 | Suarez | G06F 21/53 |
| 2017/0272516 A1* | 9/2017 | Deakin | H04L 67/1095 |
| 2018/0041491 A1* | 2/2018 | Gupta | H04L 63/083 |
| 2018/0046457 A1* | 2/2018 | Branca | G06F 21/577 |
| 2018/0074852 A1* | 3/2018 | Bishop | G06F 9/45504 |
| 2018/0075009 A1* | 3/2018 | Baryshnikov | G06F 9/45558 |
| 2018/0302299 A1* | 10/2018 | Sun | H04L 41/5019 |
| 2019/0104125 A1* | 4/2019 | Dearment | G06F 9/445 |
| 2019/0104196 A1* | 4/2019 | Li | G06Q 20/382 |
| 2019/0213044 A1* | 7/2019 | Cui | G06F 16/907 |
| 2019/0227810 A1* | 7/2019 | Jacquin | G06F 21/572 |
| 2019/0243628 A1* | 8/2019 | Goldmann | G06F 8/63 |
| 2019/0273683 A1* | 9/2019 | Jiang | H04L 61/2038 |
| 2019/0373083 A1* | 12/2019 | Nucci | H04L 63/062 |
| 2019/0391897 A1* | 12/2019 | Vijendra | G06N 20/00 |
| 2020/0042365 A1* | 2/2020 | Tanna | G06F 9/465 |
| 2020/0076685 A1* | 3/2020 | Vaidya | H04L 61/3015 |
| 2020/0125572 A1* | 4/2020 | Hanckel | G06F 16/248 |
| 2020/0183716 A1* | 6/2020 | Beddus | G06F 21/577 |
| 2020/0218798 A1* | 7/2020 | Kosaka | G06F 21/629 |
| 2020/0310915 A1* | 10/2020 | Alluboyina | G06F 11/1469 |
| 2020/0314015 A1* | 10/2020 | Mariappan | H04L 41/0806 |
| 2020/0319935 A1* | 10/2020 | Srivastava | G06F 9/4856 |
| 2020/0319978 A1* | 10/2020 | Smith-Uchida | G06F 9/45558 |
| 2020/0326991 A1* | 10/2020 | Carroll | G06Q 10/0631 |
| 2020/0327371 A1* | 10/2020 | Sharma | H04L 67/34 |
| 2020/0344132 A1* | 10/2020 | Padmanabhan | H04L 9/0643 |
| 2020/0348984 A1* | 11/2020 | Giannetti | G06F 8/60 |
| 2020/0364086 A1* | 11/2020 | Gavali | G06F 11/3414 |
| 2020/0382617 A1* | 12/2020 | Trapane | H04L 67/327 |
| 2021/0004270 A1* | 1/2021 | Singh | G06F 9/5077 |
| 2021/0004292 A1* | 1/2021 | Zlotnick | G06F 9/5038 |
| 2021/0014300 A1* | 1/2021 | Zhu | H04L 67/1097 |
| 2021/0019194 A1* | 1/2021 | Bahl | H04L 67/34 |
| 2021/0021676 A1* | 1/2021 | Reineke | H04L 67/10 |
| 2022/0124013 A1* | 4/2022 | Chitalia | G06F 11/3006 |

* cited by examiner

Cluster Details: NAD1700 o Storage Level Restrictions: Enabled    o Network Quotas: Enabled

Profile | Capacity Utilization | Tenants

Space Utilization

☐ Free  ☐ 81204 - CIB  ☐ 103257 - CCB  ☐ 83904 - CIB  ☐ Others

| Application | LOB | Storage (GB) | | Forecast (GB) | |
|---|---|---|---|---|---|
| | | Utilized | Reserved | 6 months | 1 year |
| 81204 - Commercial Card Data Services | CIB | 1 | 20 | 50 | 50 |
| 103257 - Merchant Services – API Gateway | CCB | 17.299986 | 20 | 20 | 20 |
| 83904 - GCC Backoffice Services | CIB | 7 | 20 | 50 | 50 |
| 23610 - SELM | CT | 0 | 20 | 100 | 150 |
| 88474 - GTI Quantum | GTI | 2 | 20 | 500 | 1024 |
| 102835 - Event Streaming | GTI | 4.5 | 10 | 10 | 10 |
| 90650 - Workspace Analytics and Tools | GTI | 4.95 | 5 | 10 | 10 |
| 89030 - Data Services Platform | CT | 0 | 5 | 20 | 50 |
| 85028 - RDT-Smart Proxy | CT | 1 | 2 | 2 | 2 |
| 105474 - OPS FABRIC | GTI | 1 | 1 | 1 | 1 |
| 105239 - Helix Service Elemental | CIB | 0.6 | 1 | 1 | 1 |
| 104032 - Commercial Card Service Operations Client | CIB | 0 | 1 | 2 | 4 |
| Total | | 39.349986 GB | 125 GB | 766 GB | 1372 GB |

ENTERPRISE CONTROL PLANE FOR DATA STREAMING SERVICE

FIELD OF THE INVENTION

The present invention relates generally to data streaming, and more particularly to an enterprise control plane for a distributed streaming service.

BACKGROUND

Data streaming services are used extensively in various business applications to allow different types of users to publish, record, store, and/or process streams of records. Apache Kafka is one such system that provides a distributed messaging platform used for data streaming. Kafka is run as a cluster on one or more servers that may be located in different data centers. The clusters store records in categories referred to as "topics." "Producers" may comprise applications that publish a stream of records to one or more Kafka topics. "Consumers" are applications that subscribe to one or more Kafka topics. These constitute the typical artifacts within a data streaming service such as Kafka: clusters, topics, producers, and consumers. Kafka also allows applications to process streams by consuming an input stream, processing the data, and producing an output stream.

The Kafka platform allows a user to set size restrictions on topics which will prevent a topic from growing indefinitely. Kafka also supports enforcing quotas (i.e., network and request rate quotas) which will throttle application network utilization and CPU utilization on a cluster. By combining storage level restrictions and quotas (network and request rate), it is possible to configure a Kafka cluster to be shared by multiple applications. Nevertheless, providing multi-tenant Kafka service at an enterprise level at a large scale poses significant challenges. Existing tools for enabling topic size restrictions and enforcing quotas do not scale effectively for handling multiple clusters and do not provide a proactive view on the capacity utilization/management.

These and other drawbacks exist in known systems

SUMMARY

According to one embodiment, the invention relates to an enterprise control plane for a distributed streaming platform. The enterprise control plane can provide a metadata driven process for sharing one or more clusters for multiple applications/tenants efficiently and securely with configurable controls and governance. The enterprise control plane can also provide multi-tenancy at scale, managing any number of clusters underneath. As used herein, "tenant" generally refers to an application that has been onboarded to the streaming platform and that uses resources of the cluster, e.g., a Kafka cluster. "Enterprise control plane" generally refers to an interface provided for an organization with multiple users (e.g., an enterprise) used to control, manage, and configure access to a resource such as the Kafka distributed streaming system or other streaming system.

According to one embodiment, the enterprise control plane can create a dedicated namespace for each application at a metadata level. As used herein, "namespace" generally refers to a set of data elements that collectively define the scope and character of a tenant's use of the distributed streaming platform. For example, the namespace for a tenant may include metadata that defines geographic region, line of business, environment type, entitlement information, controls and governance parameters, and the names and sizes of topics associated with the application. As used herein, "tenant" generally refers to an application that has been onboarded to the streaming platform and that uses resources of the cluster, e.g., a Kafka cluster.

The enterprise control plane can also permit applications to reserve cluster resources in advance and to manage distributed streaming platform artifacts (e.g., metadata and other information defining scope and character of use) within the application namespace. This approach can empower applications with the flexibility to choose cluster resources as needed and yet achieve efficiency in sharing the cluster among multiple applications.

These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
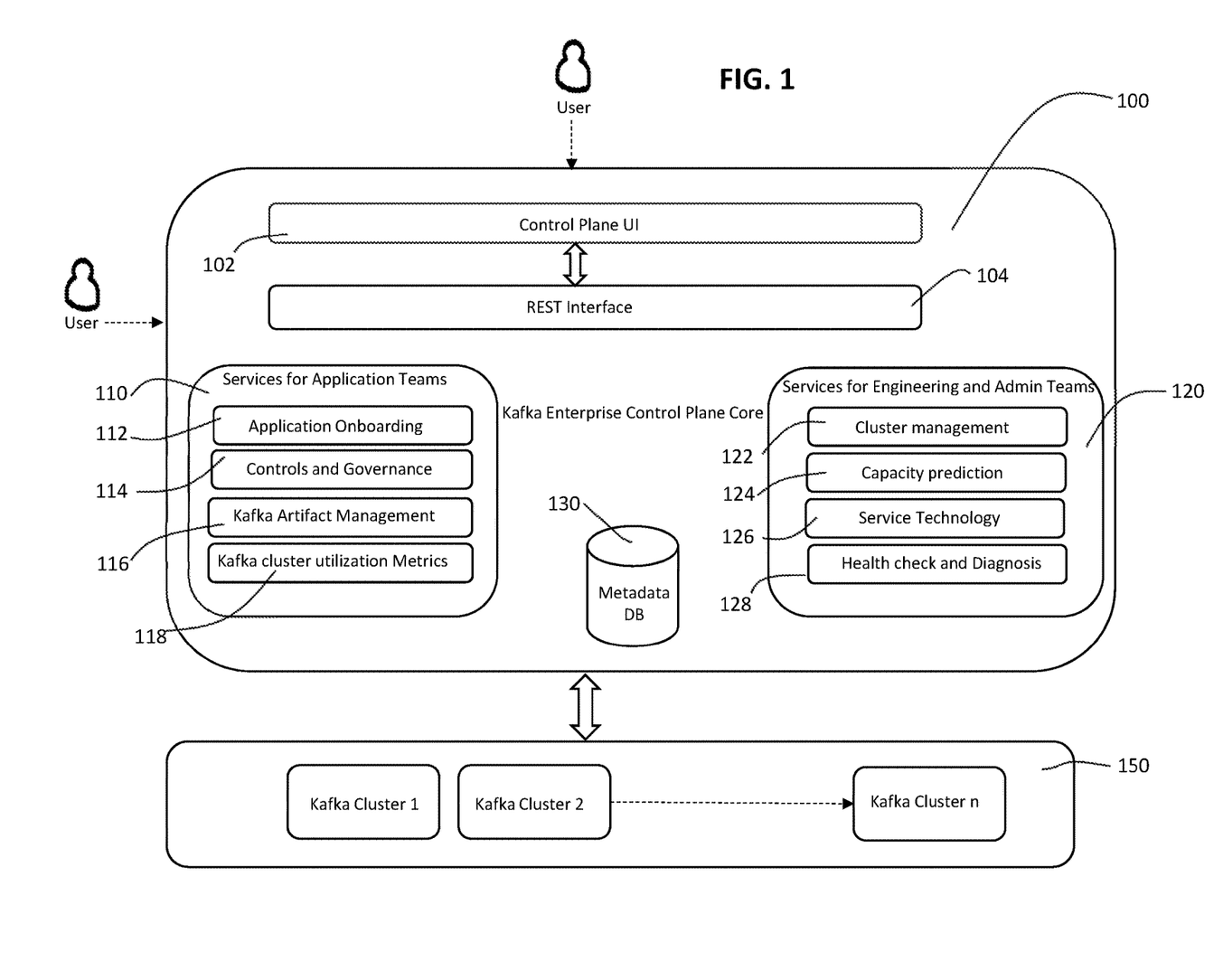
FIG. 1 is a diagram of an enterprise control plane according to an exemplary embodiment of the invention.

Referring now to the drawings, FIG. 1 is a diagram of an enterprise control plane according to an exemplary embodiment of the invention. As shown in FIG. 1, the enterprise control plane 100 provides a unified interface, including control plane user interface (UI) 102 and a representational state transfer (REST) interface 104 for both tenants and administrator teams. It enables self-service capabilities for application teams, cluster build/patch orchestration and capacity management capabilities for administrator teams. A user who is a software engineer may choose to use the REST interface in 104 to interact with the system. A user who does not have a technical background may use the control plane UI 102, which may comprise an easy to use graphical user interface for non-technical users. According to one embodiment of the invention, the enterprise control plane 100 comprises one or more servers and software for executing the functions of the enterprise control plane as described herein.

Also shown in FIG. 1 is a module 110 for providing services to application teams. The application teams may comprise, for example, teams of application developers who build and/or maintain applications that become tenants of the streaming system. The services may include, for example, application onboarding 112, controls and governance 114, artifact management 116, and cluster utilization metrics 118. According to one example, for 112 this may entail expanding geographic region requirements, editing an application name, or updating the line of business after an organizational change. For 114, this may relate to access management, such as adding a new namespace owner or removing a stale application contact. Artifact management for 116 concerns creating topics, producers, or consumers. Lastly, 118 relates to changing data used for the quotas, either increasing capacity or revising utilization metrics to match new volume requirements, for example.

FIG. 1 also illustrates a module 120 for providing services to engineering and administrator teams. The engineering teams may include teams of software engineers who develop and maintain software applications that are responsible for the control plane and the platform provider for tenants of the system. The administrator teams may include information technology (IT) administrators who control access to the system and who specify parameters governing use of the system. The services provided by module 120 may include, for example, cluster management 122, capacity prediction 124, service telemetry 126 and health check and diagnostics 128. For 122, if new clusters are added or old ones taken out of rotation for use by tenants this would be included as cluster management tasks. Capacity prediction in 124 relates to administrators of the platform adjusting threshold or headroom at the cluster level due to possible environmental constraints. For telemetry and health checks in 126 and 128 they concern the components which provide metrics and visibility into the underlying hardware's performance and overall stability. The members of application, engineering, and administrator teams can access and control the enterprise control plane 100 via personal computing devices such as desktop computers, laptop computers, tablet computers, and mobile phones, for example.

FIG. 1 also illustrates a metadata database 130. The metadata database 130 stores all the metadata associated with the use and operation of the system 100. The types of metadata stored in the metadata database 130 may include, for example: (1) application metadata including application name, line of business, primary contacts, support contacts, entitlements; (2) cluster metadata including cluster name, region, datacenters, servers the cluster is deployed on and the cluster components and their versions; (3) cluster tenants including application (tenant), cluster mapping and the resources reserved by each tenant on the cluster; (4) application-specific data streaming service artifacts, such as topics, producers, consumers, streams and their association to applications and clusters; and (5) cluster base config, which defines the common configuration for the clusters to achieve standardization across the clusters.

The enterprise control plane 100 interfaces, via network communication channels, with one or more clusters of servers for the distributed streaming system, e.g., with one or more Kafka clusters 150, as shown in FIG. 1. The configuration shown in FIG. 1 can provide a number of advantages to an enterprise such as a business having a variety of users using a streaming technology such as Kafka. For example, the enterprise control plane 100 can provide end-to-end self-service application programming interfaces (APIs) to manage a tenant's environment and can provide access to Kafka clusters 150 to remove the need for the user to be concerned about infrastructure. The system 100 allows for single-tenant (dedicated) Kafka clusters as well as a shared model (multi-tenant), with a namespace management layer to store inventory (cluster/topic/producer/consumer management), application ownership, topic metadata, and administer development lifecycles. At the infrastructure layer, the administrators have orchestration for physical broker installations, and data-driven APIs provide real-time details to end users. For application developers (or consumers) a full web portal allows easy management which provides a user interface (UI) complementing the APIs. The system provides APIs for all functionalities, multi-level resiliency, and data encryption on the wire.

The enterprise control plane 100 can provide enhanced security for the enterprise since it is centrally managed for the enterprise rather than each user independently establishing its own Kafka cluster and security protocols. The enterprise control plane 100 also provides a cost savings, since it can fully utilize each Kafka cluster rather than having an independent user under-utilize its own dedicated Kafka cluster. Users can be charged by the enterprise based on their actual usage, rather than on the full cost of a dedicated Kafka cluster. The user interface 102 enables any authorized user to onboard an application by themselves, without having to request and rely on an administrator to set up the Kafka cluster for them. The user can also create, delete, and edit topics through the module 110. And the controls and governance functionality 114 allows a user to specify role-based access rules and privileges. Software agents installed on the servers comprising the Kafka clusters 150 can also be used by the administrators of the system to remotely control and configure the Kafka clusters.

Figure 2:
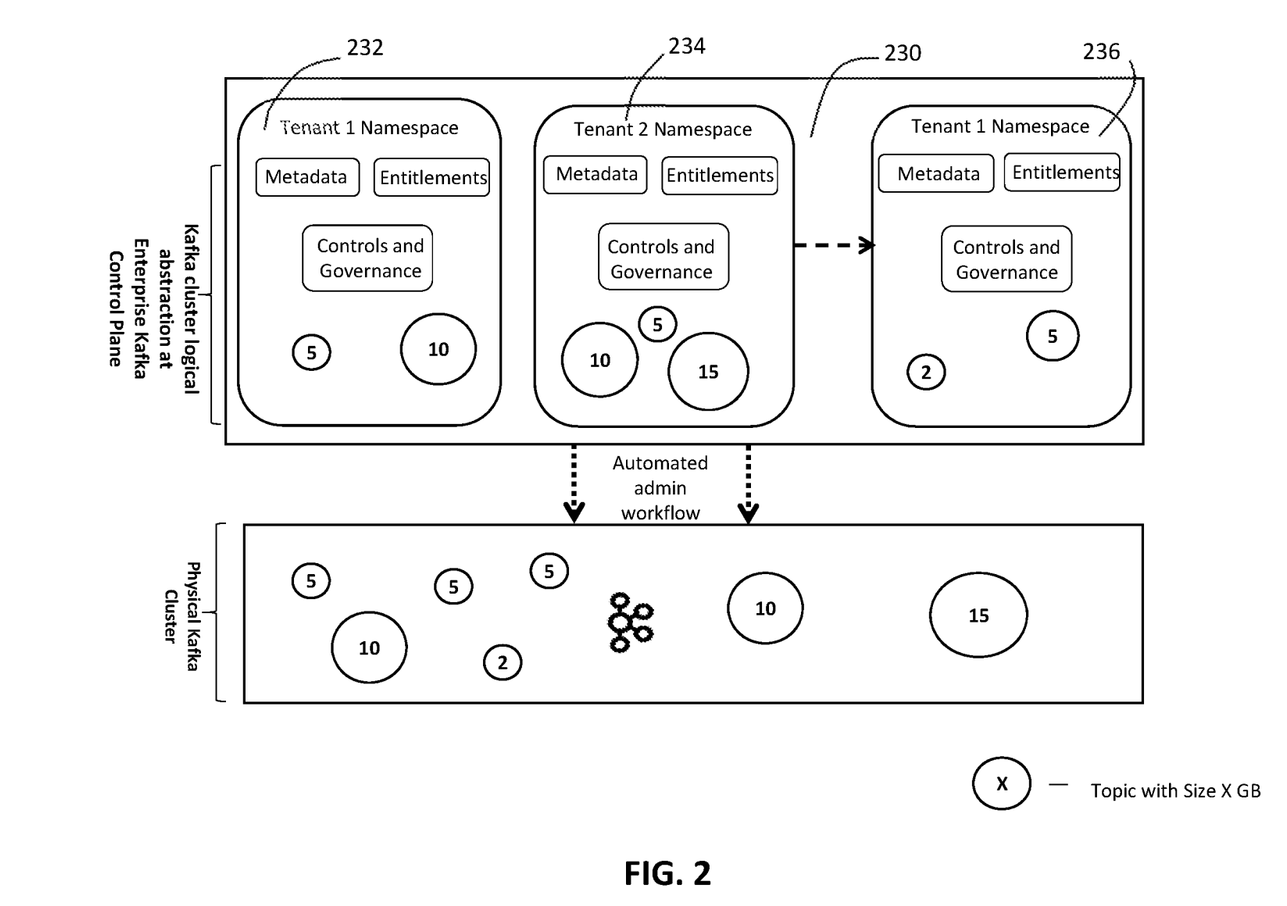
FIG. 2 is a diagram of an enterprise control plane including a cluster logical abstraction dataset according to an exemplary embodiment of the invention.

FIG. 2 illustrates a cluster logical abstraction dataset according to an exemplary embodiment of the invention. The cluster logical abstraction dataset may take the form of a dataset for each tenant namespace. For example, tenant 1 may have a dataset 232 for its namespace, tenant 2 may have a dataset 234 for its namespace, and tenant N may have a dataset 236 for its namespace. The datasets 232, 234, 236 are stored in the metadata database 130 as shown in FIG. 1. Each namespace dataset contains the data that defines a tenant's usage parameters for the streaming service, e.g., metadata, entitlement data, controls and governance parameters, and topics and size requirements for clusters. The namespace allows each tenant to easily define their desired parameters for use of Kafka or other streaming service through a convenient user interface (for non-technical users) or APIs (for users with some programming experience). The enterprise control plane 100 maintains the logical abstraction data at a metadata level for each data streaming service cluster, such as a Kafka cluster, and it allows applications to reserve storage on the cluster. All the data streaming service artifacts created by the application are maintained within the application namespace. The artifacts may include the Topics which store the messages being transmitted, the Producers publishing those messages, and the Consumers that subscribe to those topics. Each artifact (topic/producer/consumer) created within the namespace belongs to the application/tenant that owns the namespace. In an enterprise, often artifacts such as producer/consumers owned by a tenant may need to access artifacts (topics) owned by another tenant within the Kafka cluster. The enterprise control plane 100 tracks cluster artefacts' ownership and lineage metadata to establish relationships among the tenants, according to one embodiment.

Figure 3:
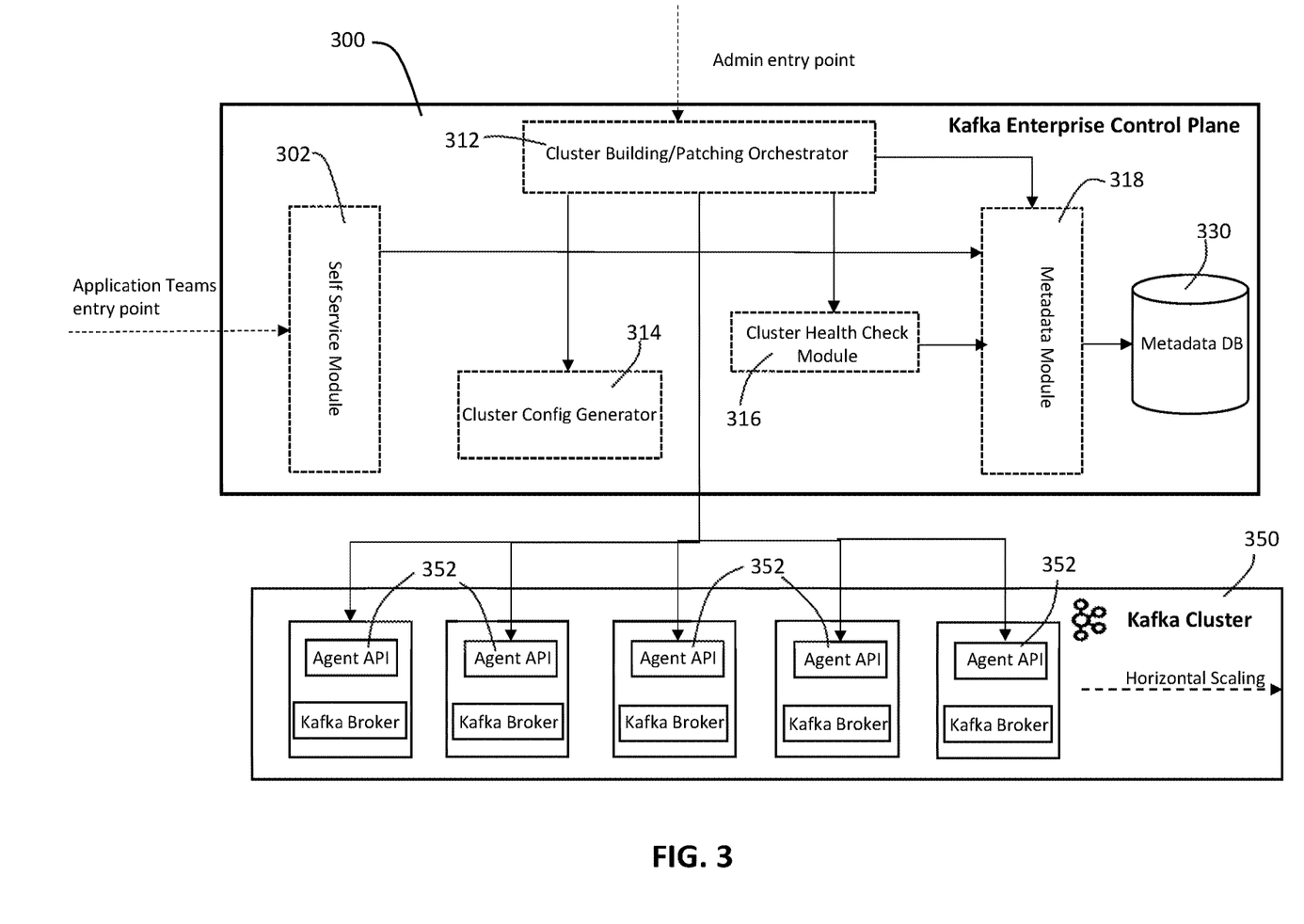
FIG. 3 is a diagram of various functional modules in an enterprise control plane according to an exemplary embodiment of the invention.

FIG. 3 illustrates a number of functionalities of the enterprise control plane according to an exemplary embodiment of the invention. As shown in FIG. 3, the enterprise control plane 300 includes a self-service module 302 for application teams. The self-service module 302 enables an application team member to use the interface to establish or update a namespace with an easy to use user interface. The self-service module 302 obtains the user's desired parameters and then stores them in the metadata database 330 via the metadata module 318.

The enterprise control plane 300 also includes a cluster building/patching orchestrator 312 which allows an administrator or engineer to configure the parameters for coordinating the automated building and patching of clusters. The cluster building/patching orchestrator 312 may itself interface with other modules in order to accomplish its functions. For example, it may interface with a cluster configuration generator 314 that calculates or derives an appropriate cluster configuration based on various operating parameters and operational data. The orchestrator 312 may also call upon a cluster health check module 316 to monitor and report on the health of each cluster and a metadata module 318 to coordinate the reading and writing of metadata to and from the metadata database 330.

Once the orchestrator 312 has accomplished all of the necessary calculations, it can be used to configure or update the configuration of the Kafka clusters. As shown in FIG. 3, the orchestrator 312 is in communication with a series of Agent APIs 352 which reside on the Kafka servers (Kafka brokers).

Figure 4:
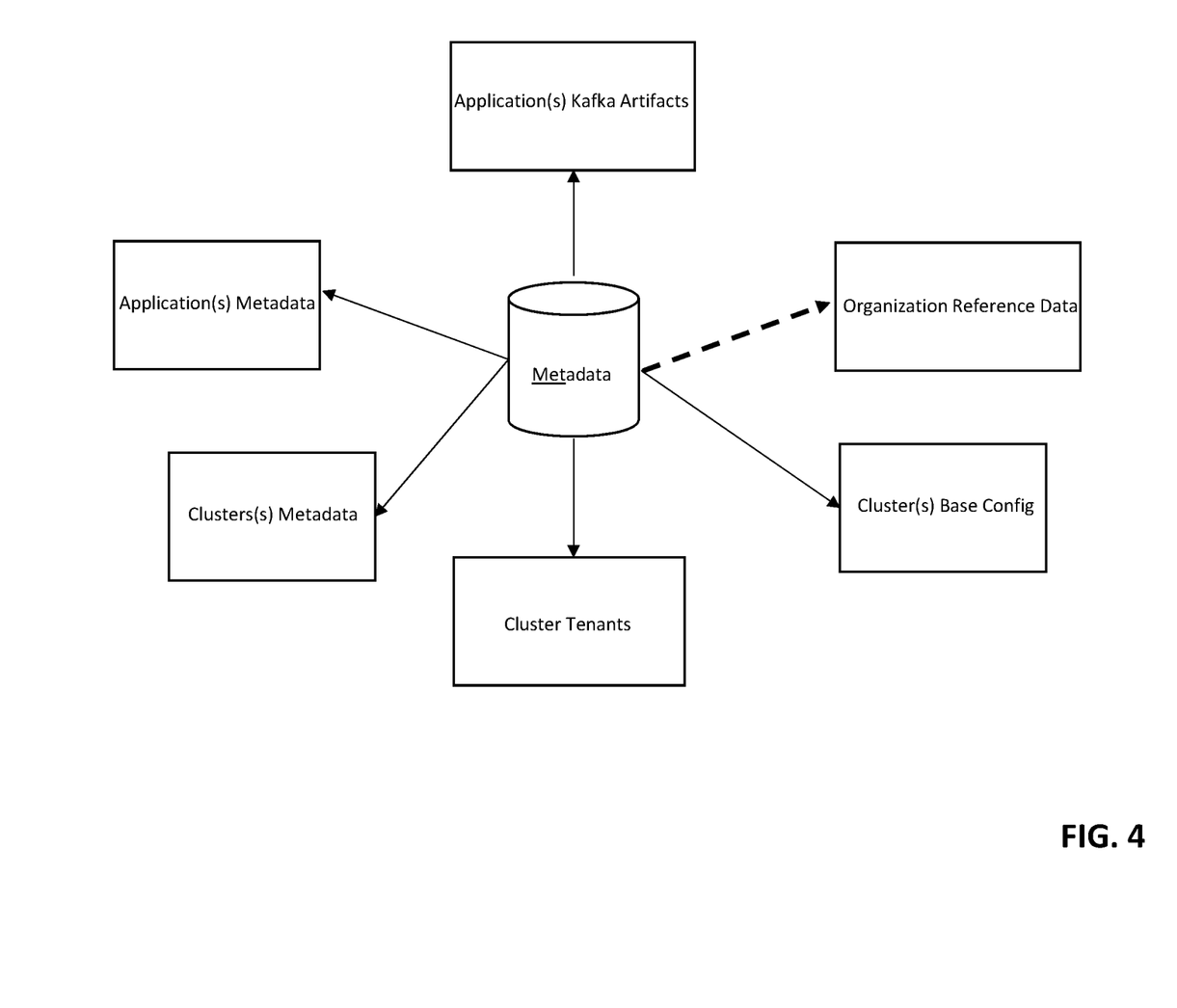
FIG. 4 is a diagram illustrating various metadata entities used with an enterprise control plane for a distributed streaming platform according to an exemplary embodiment of the invention.

FIG. 4 illustrates metadata entities according to an exemplary embodiment of the invention. As shown in FIG. 4, the metadata entities may include application-specific data streaming service artifacts, application(s) metadata, clusters(s) metadata, cluster tenants, organization reference data, and cluster(s) base config. For example we may have a simple Credit-Card-Application-12345 using Kafka-Cluster-1000 which is also shared with other applications in the same Consumer Banking organization such Card-Activation-67890 or Rewards-Program-98765. This particular application might have a Topic called 'transaction' where a Producer is retrieving information from point-of-sale terminals and sending these messages to the topic. The Consumer(s) will be retrieving these transactions and passing them along to retailers for order fulfillment. In this over-simplified example, the Application, Topic, Producer, Consumer, and corresponding metadata and configuration would all be stored in the central database.

Figure 5:
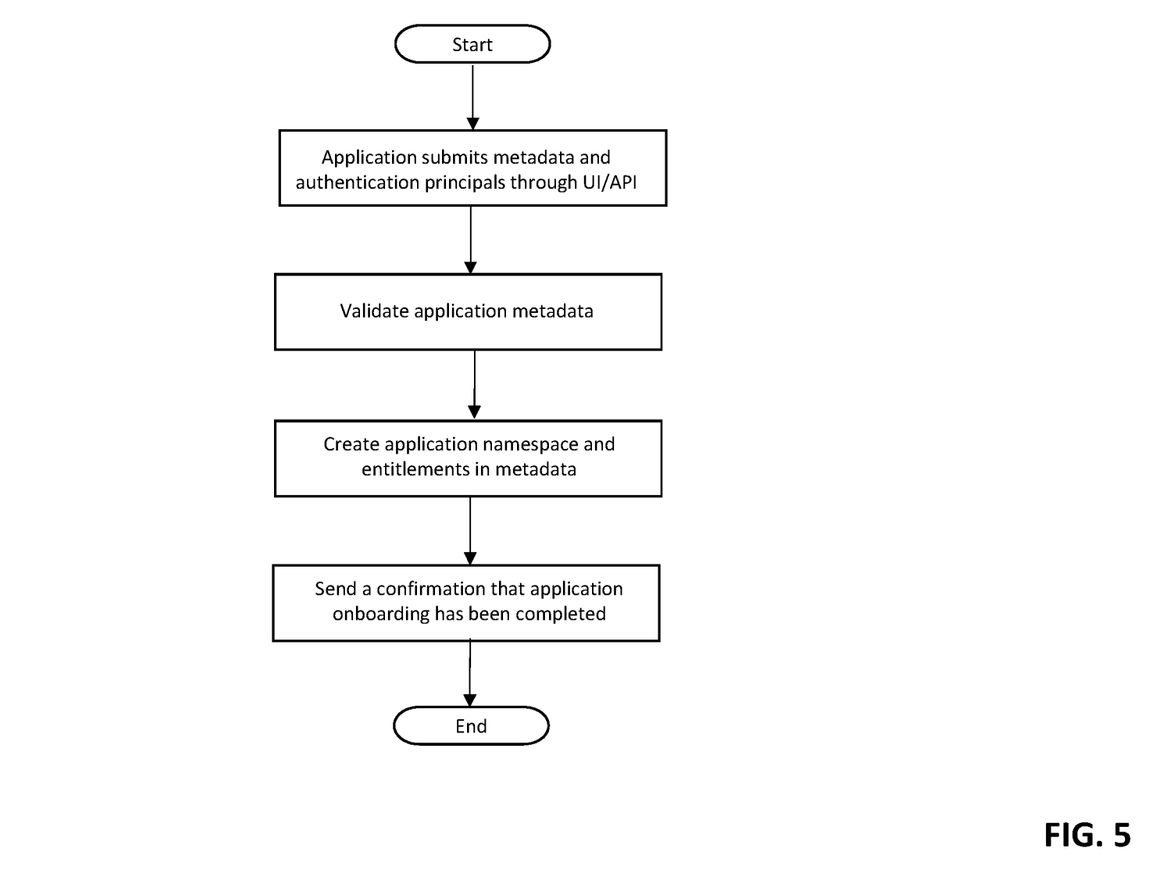
FIG. 5 illustrates an example of a workflow for application onboarding according to an exemplary embodiment of the invention.

FIG. 5 illustrates an example of a work flow for application onboarding according to an exemplary embodiment of the invention. As shown in FIG. 5, the process starts with a member of the application team submitting metadata and authentication principals through the user interface or APIs. The application metadata is then validated via internal systems of record. Next, the enterprise control plane creates an application namespace and entitlements and stores them as metadata in the metadata database. Finally, the system sends a confirmation to the user that application onboarding has been completed.

Figure 6:
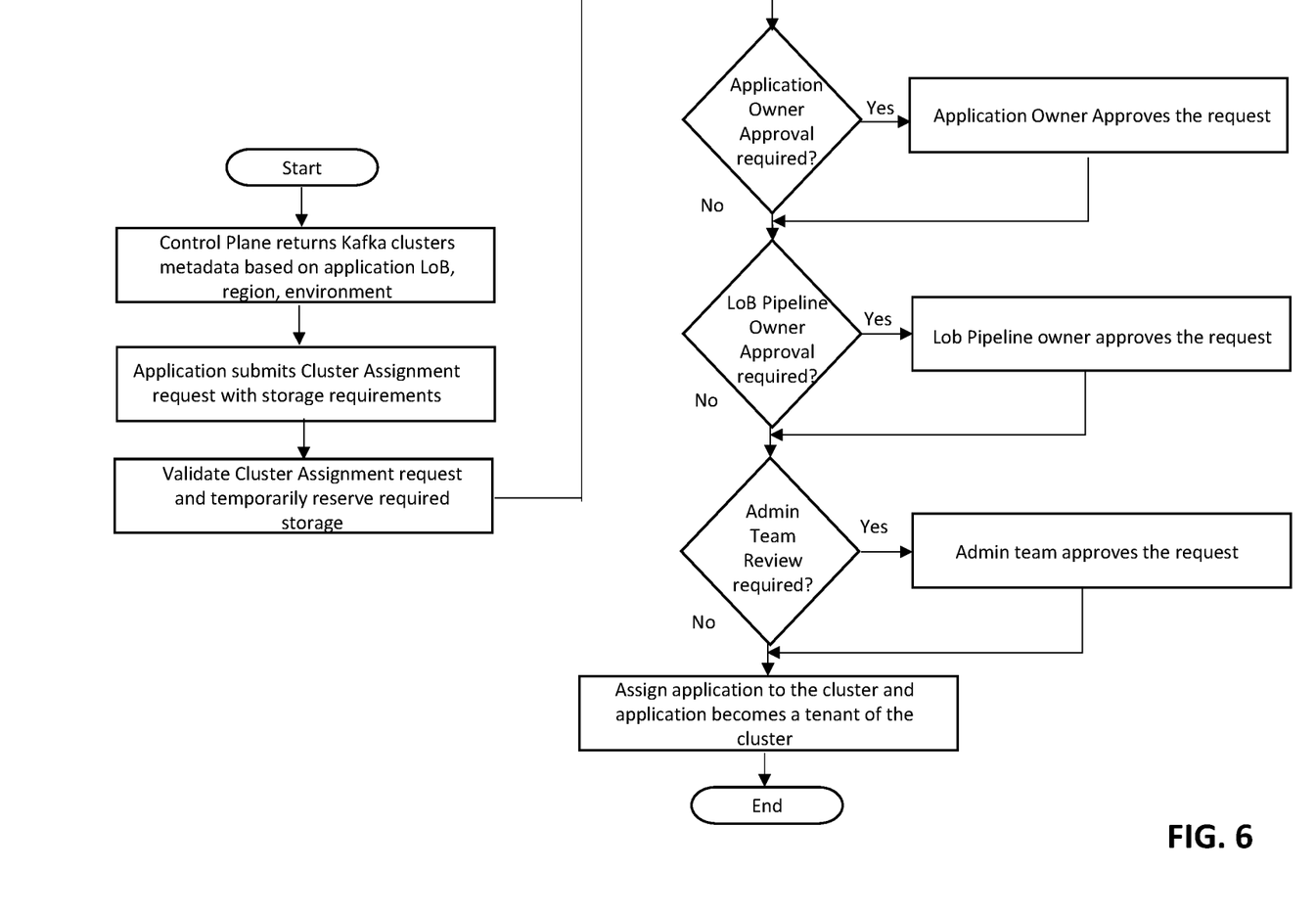
FIG. 6 illustrates an example of a workflow for cluster assignment according to an exemplary embodiment of the invention.

FIG. 6 illustrates an example of a workflow for cluster assignments according to an exemplary embodiment of the invention. As shown in FIG. 6, the process begins with the control plane returning specific cluster metadata, e.g., metadata on certain Kafka clusters, based on the line of business (LoB), region, and environment. Next, the application submits a cluster assignment request with storage requirements. Next the control plane validates the cluster assignment request and temporarily reserves the required storage on the cluster. The process then includes a step of determining whether approval is required from the application owner. If yes, the application owner approves or disapproves the request. If no, then the process proceeds to the step of determining whether approval is required from the LoB pipeline owner. If yes, then the LoB pipeline owner approves or disapproves the request. If no, then the process proceeds to the step of determining whether admin team review is required. If yes, then the admin team conducts the review. If no, then the application is assigned to the cluster and the application becomes a tenant of the cluster. The workflow is visible in the Control Plane UI and users of the system are notified via email at every stage of the process.

Figure 7:
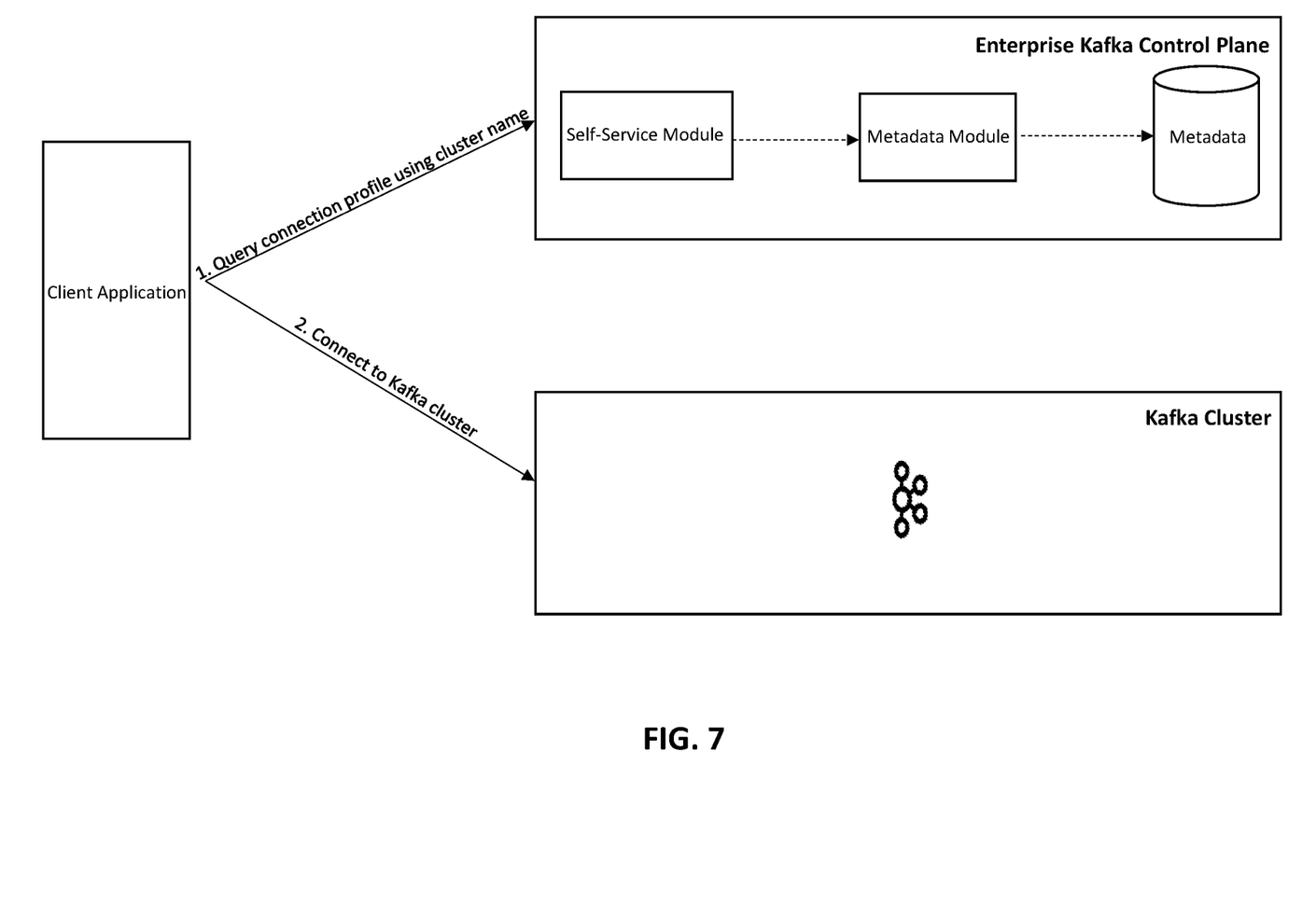
FIG. 7 illustrates an example of a process for enabling client application teams to get a cluster connection profile dynamically according to an exemplary embodiment of the invention.

FIG. 7 illustrates an example of a process for enabling client application teams to get a cluster connection profile dynamically according to an exemplary embodiment of the invention. As shown in FIG. 7, the process starts with a client application querying the enterprise control plane for a connection profile using the cluster name. The enterprise control plane utilizes the self-service module to respond to the query. The self-service module calls the metadata module, which retrieves the applicable metadata related to the connection profile from the metadata database. The applicable metadata includes Application Name, Unique Identifier, Cluster Name, Authorized Users, and Entitlements. The metadata for the cluster connection profile is returned to the client application in response to the query. The client application can then connect to the Kafka cluster using the metadata.

Figure 8:
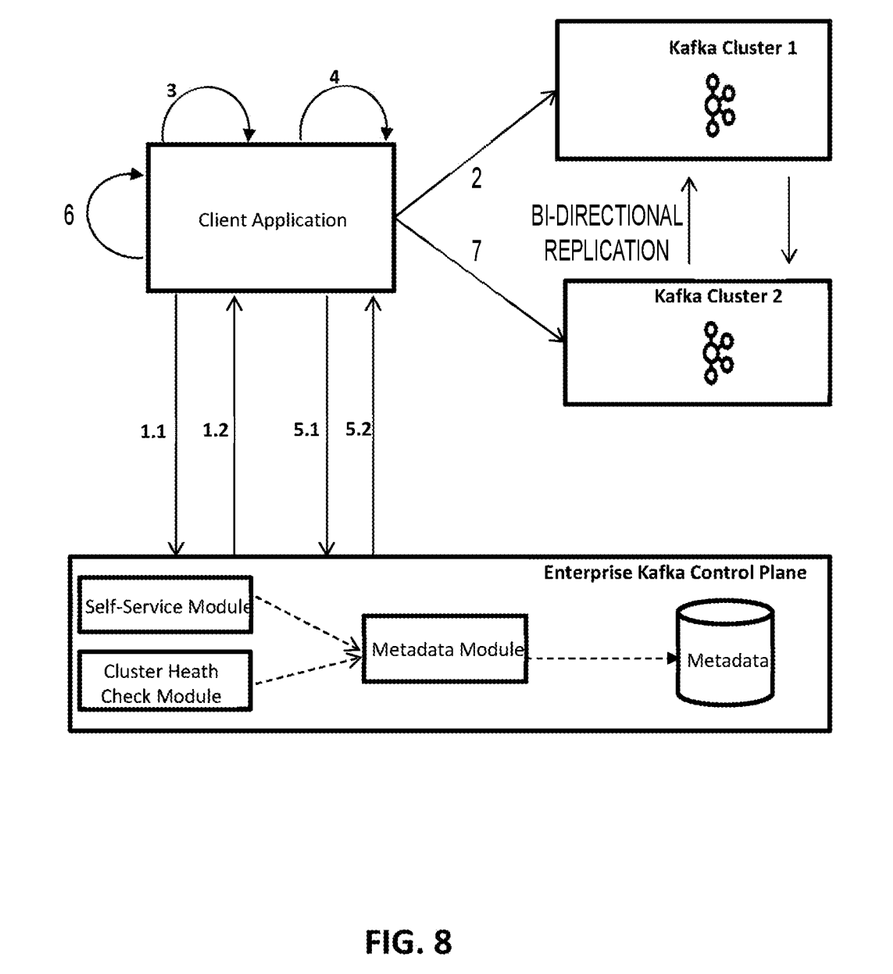
FIG. 8 illustrates an example of a process for enabling automated cluster failover for client applications using the enterprise control plane according to an exemplary embodiment of the invention.

FIG. 8 illustrates a process for enabling automated cluster failover for client applications using the enterprise control plane according to an exemplary embodiment of the invention. In step 1.1, the client application queries the enterprise control plane for the connection profile for Cluster 1. In step 1.2, the enterprise control plane responds with the connection profile for Cluster 1 and its replicated cluster, Cluster 2. In step 2, the application connects to Cluster 1 and continues to produce to/consume from Cluster 1.

In step 3, according to one example, the client application observes errors in connecting to Cluster 1. In step 4, the client application retries a configured number of times connecting to Cluster 1. In step 5.1, the client application queries for the cluster health index for Cluster 1. The cluster health index provides a measure of health of the cluster and may include values such as: 0 if the cluster is healthy; 1 if the cluster is healthy but running on reduced capacity; and 2 if the cluster is not healthy, with the result that a failover process is conducted. In step 5.2, the enterprise control plane responds with the cluster health index for Cluster 1.

In step 6, the client application processes the cluster health index and initiates a failover process if the cluster is not healthy. In step 7, the application connects to Cluster 2 and continue to produce to/consume from Cluster 2.

Figure 9:
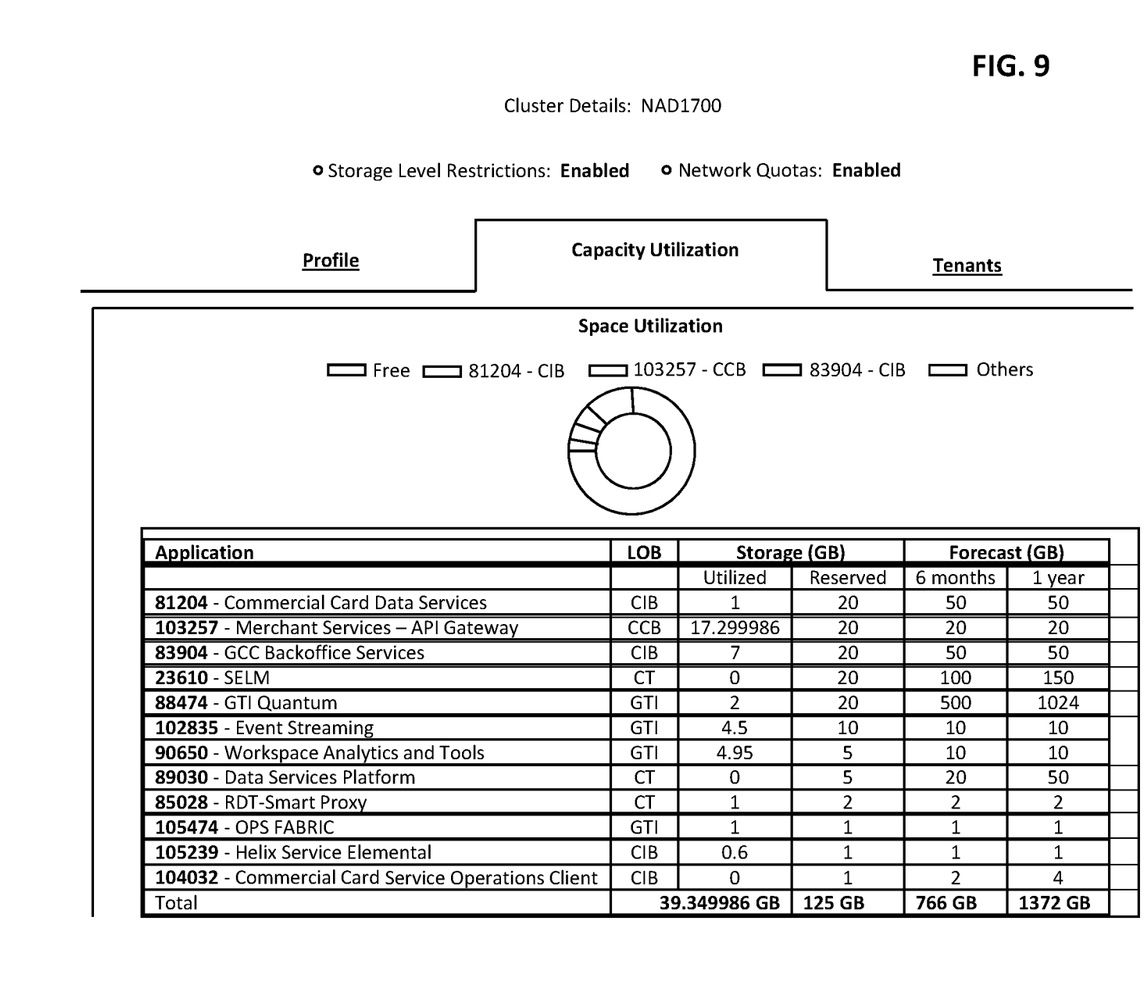
FIG. 9 illustrates an example of a graphical user interface (GUI) for visualization of cluster capacity according to an exemplary embodiment of the invention.

FIG. 9 illustrates an example of a graphical user interface (GUI) for cluster capacity visualization according to an exemplary embodiment of the invention. As shown in FIG. 9, the capacity visualization for the cluster can be presented as a space utilization graphic illustrating the actual utilization for different applications in different lines of business within the enterprise. The table in FIG. 9 also illustrates the storage utilized in gigabytes (GB), the storage reserved, and a forecast for storage needed in the upcoming six month and one year period. The table also presents the totals which enables an administrator to easily visualize current and future capacity needs for the cluster.

As discussed above, the enterprise control plane 100 may include one or more computing devices, such as servers, databases, and personal computing devices. The enterprise control plane 100 may also include one or more networks that connect the various computing devices shown in the figures. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. Personal computing devices such as desktop computers, laptop computers, tablet computers and mobile phones may be used by users and system administrators to access and control the system 100.

The system may be operated by an enterprise, business or other organization that provides distributed streaming services, e.g., Kafka streaming services, to its employees, clients, contractors, and/or other parties. The enterprise control plane 100 may be embodied primarily in the system 100. The system 100 includes or interfaces with one or more clusters, such as Kafka clusters 150.

Those skilled in the art will appreciate that the system diagrams discussed above are merely examples of an enterprise control plane configuration and are not intended to be limiting. Other types and configurations of networks, servers, databases and personal computing devices may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers shown in the figures may be stored and cataloged in one or more databases, which may comprise or interface with a searchable database and/or a cloud database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The system described above may include a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be located in the same physical location. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The computing devices in the figures may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for providing an enterprise control plane for a data streaming service, the method comprising:
providing a control plane user interface to enable a first user to define a cluster logical abstraction dataset for one or more applications, comprising an application namespace, metadata, entitlement data, controls and governance data, and topics and size requirements related to one or more clusters;
storing the cluster logical abstraction dataset in a metadata database within the enterprise control plane;

establishing one or more relationships among a plurality of applications based on one or more ownership and lineage metadata associated with one or more application-specific data streaming service artifacts maintained in the application namespace;

providing a representational state transfer (REST) interface to enable a second user to specify one or more cluster metadata associated with one or more applications;

automatically configuring the one or more clusters according to the cluster logical abstraction dataset or the one or more cluster metadata;

automatically authorizing the one or more applications based on the controls and governance data or the one or more cluster metadata;

automatically onboarding the one or more applications to consume one or more data streaming services from the one or more clusters following an authentication of the one or more applications;

installing a software agent on one or more servers of the one or more clusters to allow an administrator to automatically monitor a capacity of the cluster and a health of the cluster; and providing an application programming interfaces (API) based mechanism to enable an automatic failover of the one or more applications if the health of the cluster fails to maintain a predefined health level.

2. The method of claim 1, wherein the one or more metadata associated with one or more application-specific data streaming service artifacts are automatically maintained by the enterprise control plane.

3. The method of claim 1, further comprising enabling the second user to specify one or more application metadata for automatically configuring the cluster.

4. The method of claim 1, wherein the cluster logical abstraction dataset, the one or more cluster metadata and the one or more application metadata are provided to the enterprise control plane using one or more personal and mobile computing devices.

5. The method of claim 1, wherein the second user specifies the one or more cluster metadata and the one or more application metadata using an application programming interface (API).

6. The method of claim 1, wherein the control plane user interface comprises a basic graphical user interface for one or more third users to thereby enable the one or more third users to define a cluster logical abstraction dataset for the one or more applications.

7. The method of claim 1, wherein the automatic configuration of the cluster according to the cluster logical abstraction dataset or the one or more cluster metadata is accomplished using a cluster building orchestrator.

8. The method of claim 7, wherein the cluster building orchestrator is in communication with one or more agent APIs within each of the one or more clusters associated with the data streaming service.

9. The method of claim 1, wherein the automatic failover involves a client application querying the enterprise control plane for a health index of the cluster to which it is connected and receiving a response from the enterprise control plane regarding the health index of the cluster.

10. The method of claim 9, wherein the automatic failover comprises reconnecting to a second cluster, based on the response from the enterprise control plane, and consuming one or more data streaming services from the second cluster.

11. The method of claim 1, wherein the enterprise control plane interfaces with one or more clusters of servers associated with a data streaming service via one or more network communication channels.

12. The method of claim 1, further comprising the enterprise control plane automatically assigning each of the one or more applications to a cluster from the one or more clusters associated with the data streaming service.

13. The method of claim 1, wherein the cluster logical abstraction dataset comprises a dedicated dataset for each of one or more namespaces associated with each of one or more tenants.

14. The method of claim 1, wherein the automatic onboarding of the one or more applications further comprises a creation, by the enterprise control plane, of an application namespace and entitlements for each of the one or more applications.

15. The method of claim 1, wherein the automatic onboarding of the one or more applications is initiated by a submission of metadata and the authentication of the one or more applications through the control plane user interface or the REST interface.

16. The method of claim 1, further comprising an assignment, by the enterprise control plane, of each of the one or more applications, to a cluster in response to a cluster assignment request and storage requirements received through the control plane user interface or the REST interface.

17. The method of claim 16, wherein the assignment of each of the one or more applications to the cluster is contingent upon an approval process involving an approval from a plurality of involved parties.

18. The method of claim 17, wherein the approval process is visible through the control plane user interface.

19. The method of claim 1, further comprising a dynamic assignment, by the enterprise control plane, of a cluster connection profile to an application, in response to the application querying the enterprise control plane for the cluster connection profile.

20. The method of claim 1, wherein the control plane user interface comprise a graphic representation of cluster capacity utilization, storage utilization, and storage forecast for different applications within an enterprise associated with the enterprise control plane.

* * * * *